(12) United States Patent
Kim et al.

(10) Patent No.: US 11,218,965 B2
(45) Date of Patent: Jan. 4, 2022

(54) METHOD AND APPARATUS FOR TRANSMITTING AND RECEIVING A WAKE-UP SIGNAL IN A WIRELESS COMMUNICATION SYSTEM

(71) Applicant: LG ELECTRONICS INC., Seoul (KR)

(72) Inventors: Sanggook Kim, San Diego, CA (US); Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 16/616,430

(22) PCT Filed: Jan. 4, 2018

(86) PCT No.: PCT/KR2018/000172
§ 371 (c)(1),
(2) Date: Nov. 22, 2019

(87) PCT Pub. No.: WO2018/216871
PCT Pub. Date: Nov. 29, 2018

(65) Prior Publication Data
US 2020/0178176 A1    Jun. 4, 2020

Related U.S. Application Data

(60) Provisional application No. 62/510,700, filed on May 24, 2017, provisional application No. 62/536,428, filed on Jul. 24, 2017.

(51) Int. Cl.
*H04W 52/02*    (2009.01)
*H04W 76/11*    (2018.01)
(Continued)

(52) U.S. Cl.
CPC ..... *H04W 52/0229* (2013.01); *H04J 13/0014* (2013.01); *H04W 8/24* (2013.01);
(Continued)

(58) Field of Classification Search
None
See application file for complete search history.

(56) References Cited

U.S. PATENT DOCUMENTS 7,577,113 B2 *   8/2009   Alon ................. H04W 52/0261
                                              370/311
2002/0034959 A1 * 3/2002  Jamieson ............. H04L 12/12
                                              455/517
(Continued)

FOREIGN PATENT DOCUMENTS

CN   110169144 A   *   3/2017
CN   10777085      *   3/2018

OTHER PUBLICATIONS

Lou—U.S. Appl. No. 62/501,892, US provision application (Year: 2017).*

(Continued)

*Primary Examiner* — Andre Tacdiran
(74) *Attorney, Agent, or Firm* — Lee Hong Degerman Kang & Waimey

(57) ABSTRACT

Disclosed herein is a method for transmitting a wake-up signal in a wireless communication system supporting a wake-up radio (WUR). The method performed by a network entity comprises receiving WUR capability information from a terminal; assigning a category related to an operation of a WUR module to the terminal based on the received WUR capability information; transmitting information for the assigned category to the terminal; and transmitting a wake-up signal to the terminal according to an on-duration of each category.

17 Claims, 12 Drawing Sheets

(51) Int. Cl.
*H04W 76/27* (2018.01)
*H04J 13/00* (2011.01)
*H04W 8/24* (2009.01)
*H04W 24/08* (2009.01)
*H04W 84/12* (2009.01)

(52) U.S. Cl.
CPC ... *H04W 52/0212* (2013.01); *H04W 52/0216* (2013.01); *H04W 52/0219* (2013.01); *H04W 52/0235* (2013.01); *H04W 52/0277* (2013.01); *H04W 76/11* (2018.02); *H04W 76/27* (2018.02); *H04W 24/08* (2013.01); *H04W 84/12* (2013.01)

(56) References Cited

U.S. PATENT DOCUMENTS

| | | | |
|---|---|---|---|
| 2005/0064818 A1* | 3/2005 | Assarsson | H04W 74/006 455/41.2 |
| 2006/0229023 A1* | 10/2006 | Alon | H04W 52/0261 455/69 |
| 2010/0097969 A1* | 4/2010 | De Kimpe | H04W 52/0216 370/311 |
| 2013/0229995 A1* | 9/2013 | Cai | H04W 72/10 370/329 |
| 2016/0374019 A1 | 12/2016 | Park et al. | |
| 2017/0111858 A1 | 4/2017 | Azizi et al. | |
| 2018/0103431 A1* | 4/2018 | Suh | H04B 1/707 |
| 2018/0317172 A1* | 11/2018 | Lepp | H04W 68/005 |
| 2019/0191375 A1* | 6/2019 | Cheng | H04W 52/0229 |
| 2019/0253965 A1* | 8/2019 | Gan | H04W 52/0206 |
| 2020/0037251 A1* | 1/2020 | Du | H04W 52/02 |
| 2020/0045636 A1* | 2/2020 | Huang | H04L 49/90 |
| 2020/0084720 A1* | 3/2020 | Marin | H04W 52/0206 |
| 2020/0196241 A1* | 6/2020 | Lou | H04W 52/028 |
| 2020/0275373 A1* | 8/2020 | Hwang | H04W 28/04 |

OTHER PUBLICATIONS

Lou—U.S. Appl. No. 62/502,336, US provision application (Year: 2017).*
Huang—U.S. Appl. No. 62/491,113, US provision application (Year: 2017).*
European Patent Office Application Serial No. 18804933.2, Search Report dated Sep. 25, 2020, 7 pages.
Kim, I. et al., "Initial Negotiation for WUR", doc.: IEEE 802.11-17/0070r0, XP068112492, Jan. 2017, 9 pages.
PCT International Application No. PCT/KR2018/000172, International Search Report dated Apr. 30, 2018, 2 pages.
Intel Corporation, "LP-WUR (Low-Power Wake-Up Receiver): Enabling Low-Power and Low-Latency Capability for 802.11", doc.: IEEE 802. 11-16/0027r0, Jan. 2016, 23 pages.
Michele Magno, et al., "Combined methods to extend the lifetime of power hungry WSN with multimodal sensors and nanopower wakeups", In: 2012 8th International Wireless Communications and Mobile Computing Conference (IWCMC), Aug. 2012, 8 pages.
Wilus, et al., "WUR-based Power Save Operations of AP", doc.: IEEE 802.11-16/0939r1, Jul. 2016, 12 pages.

* cited by examiner

[Fig. 1]
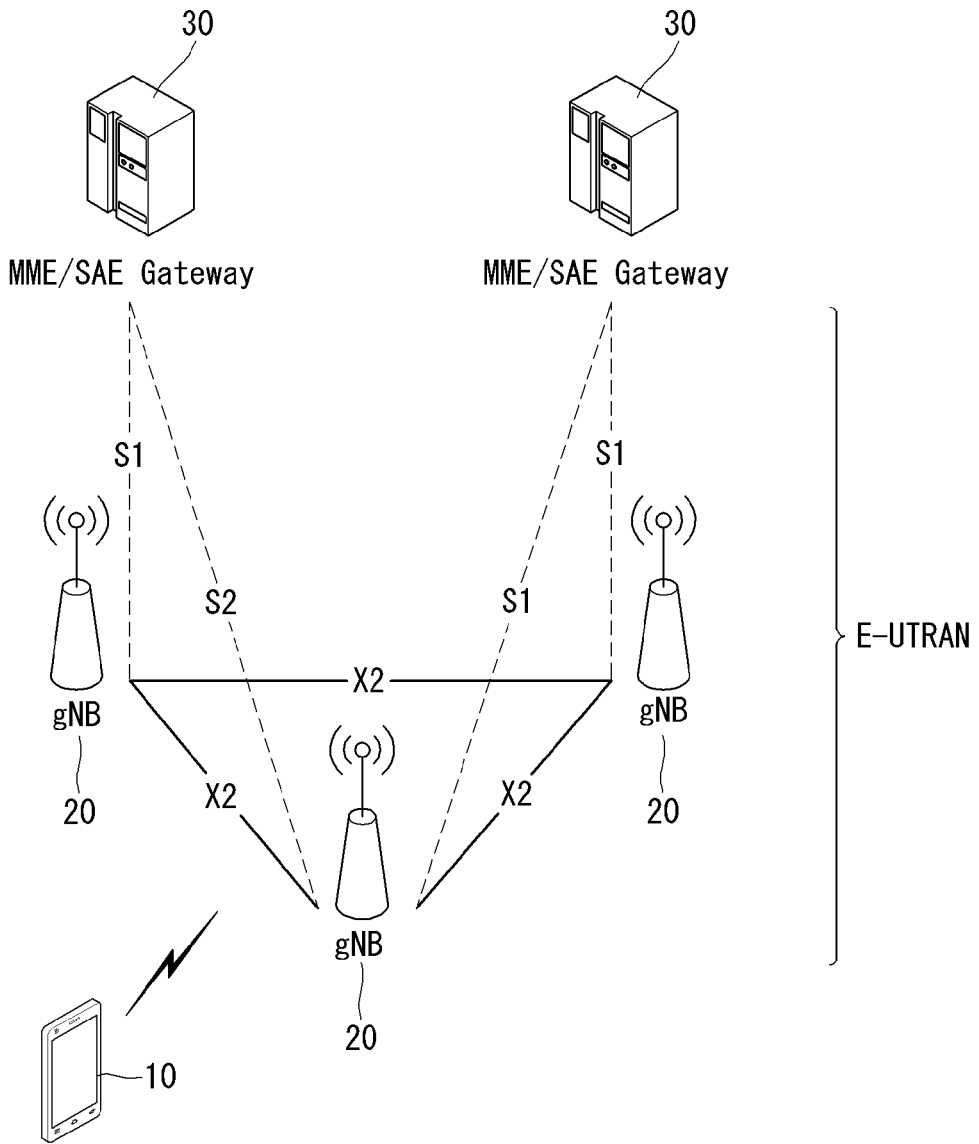

[Fig. 2]
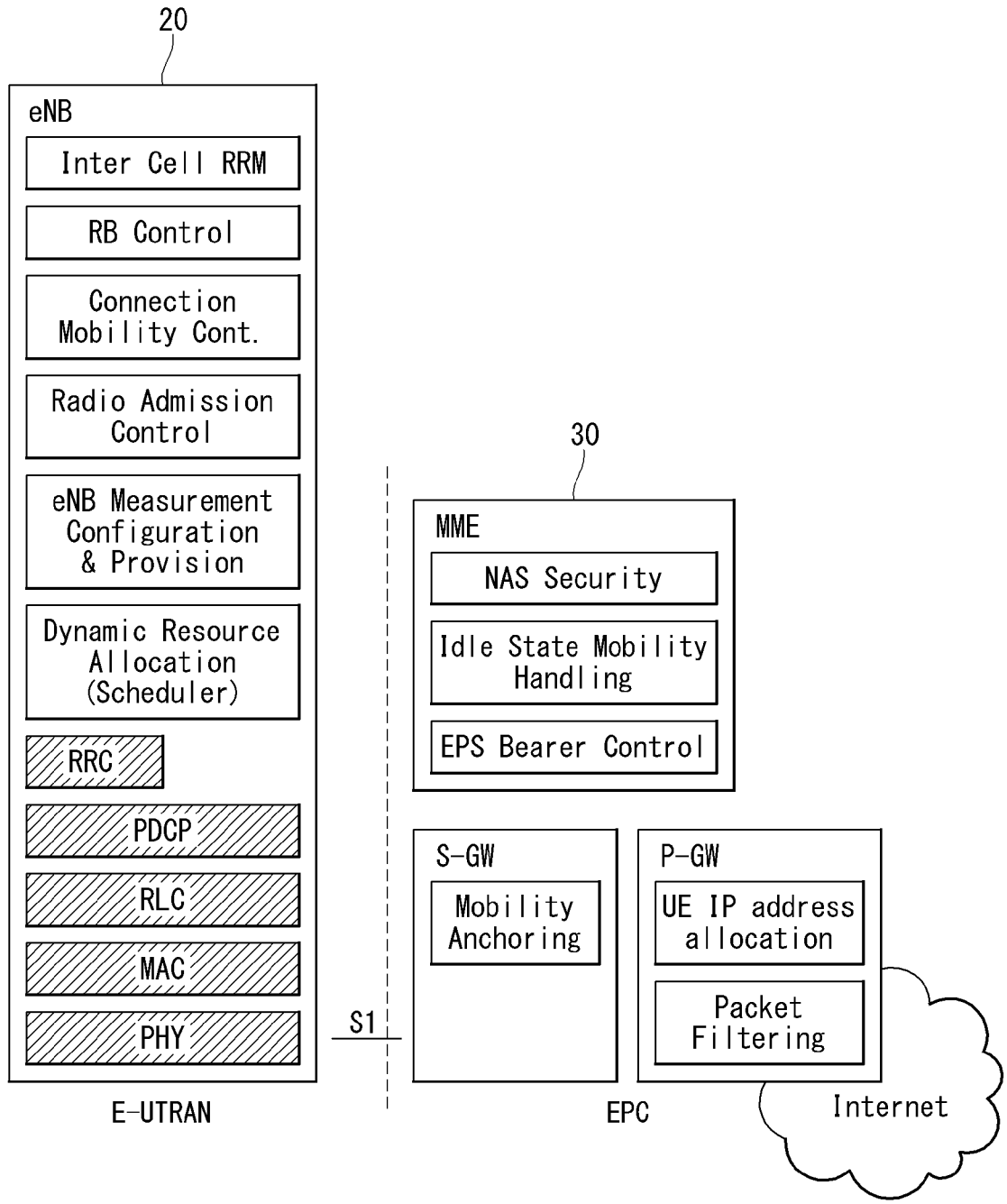

[Fig. 3]
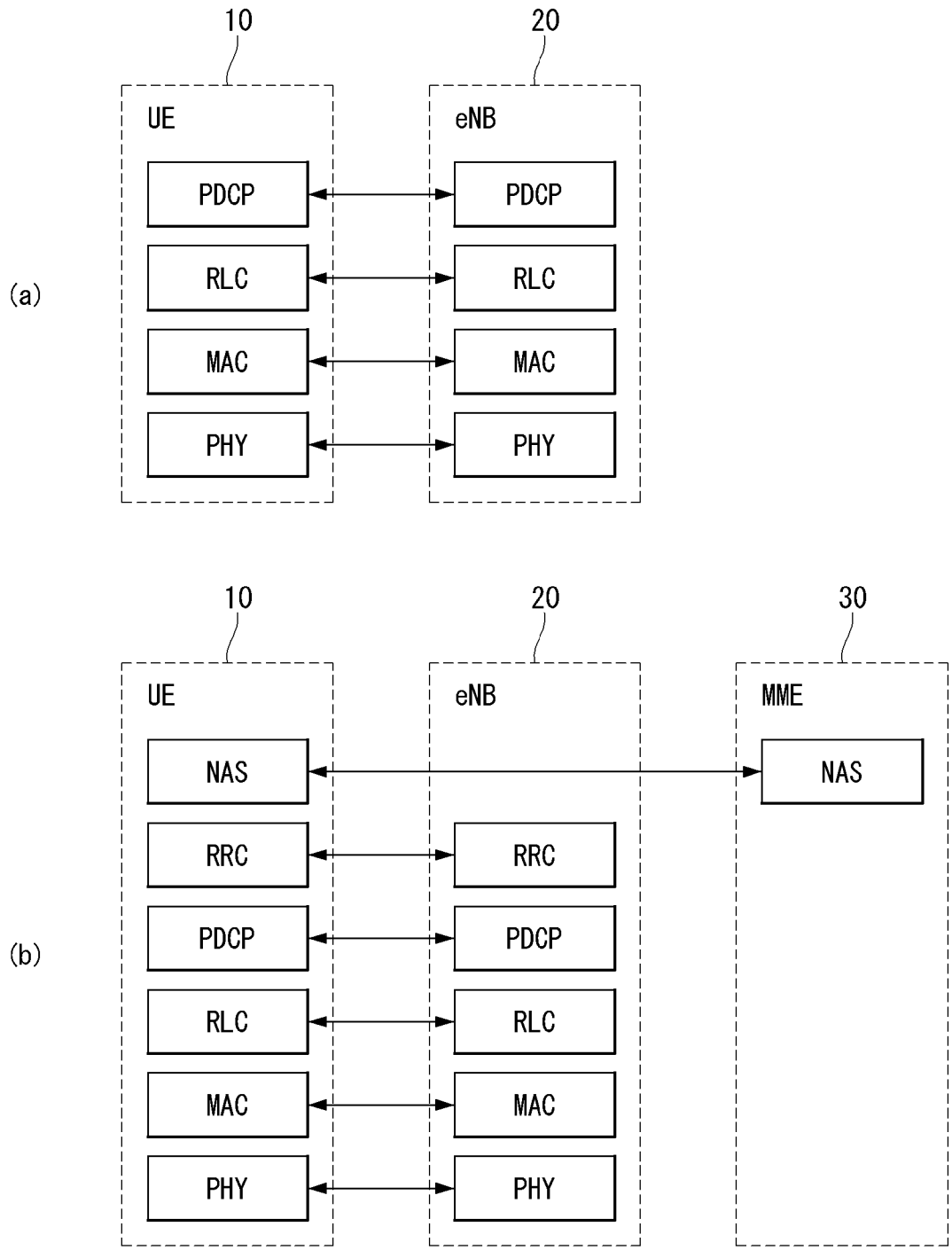

[Fig. 4]
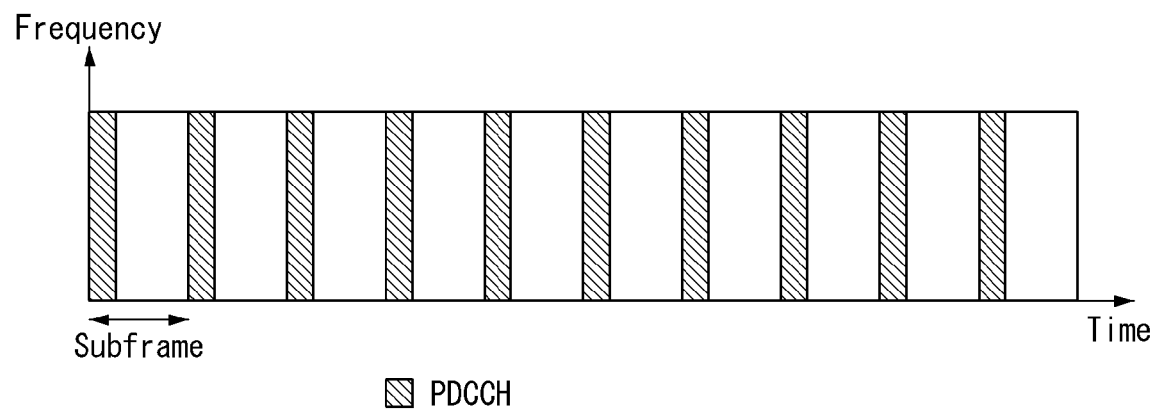
[Fig. 5]
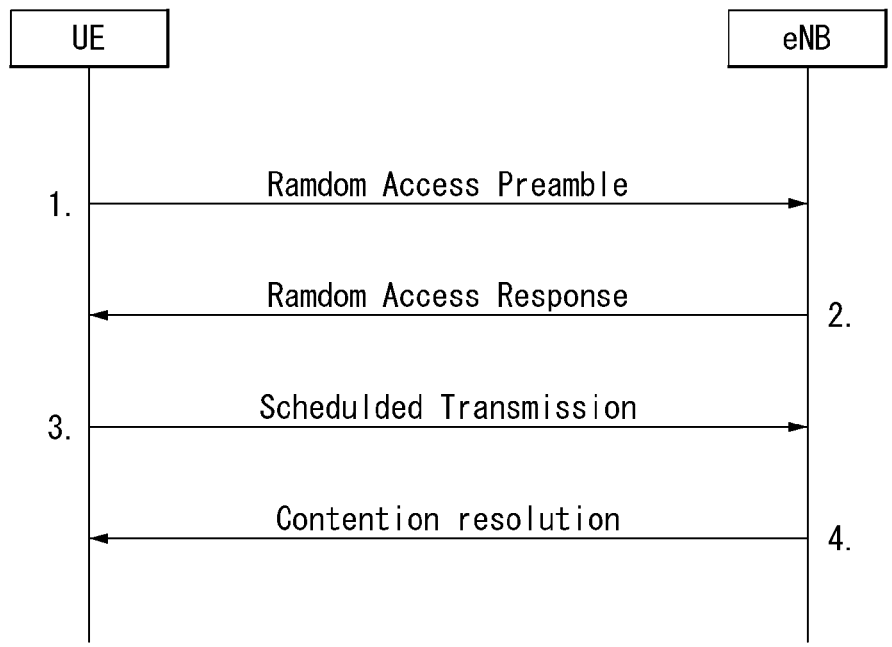

[Fig. 6]
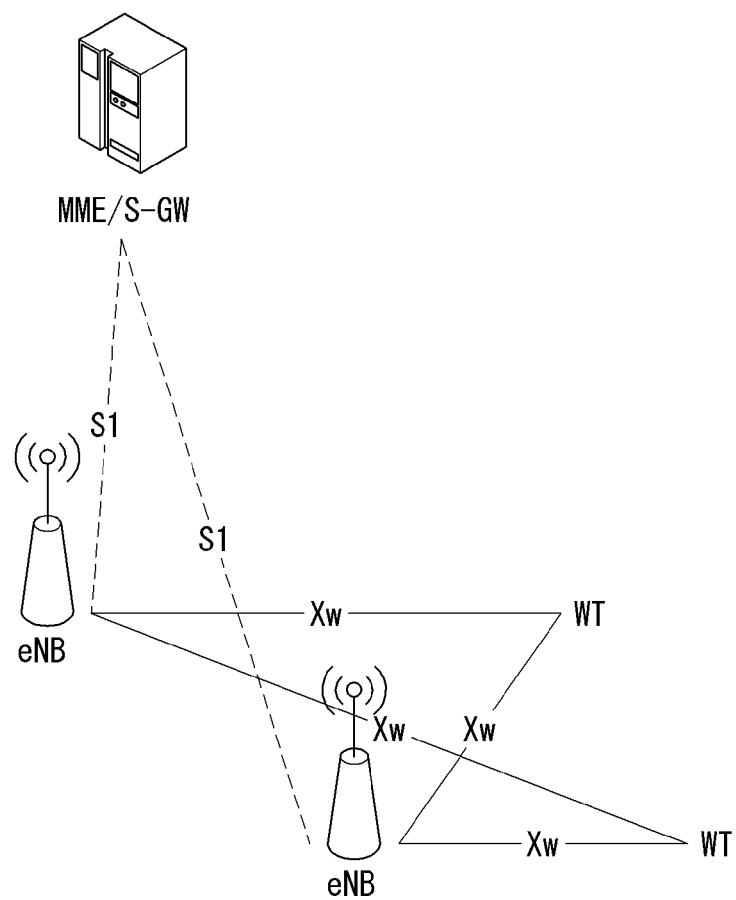

[Fig. 7]
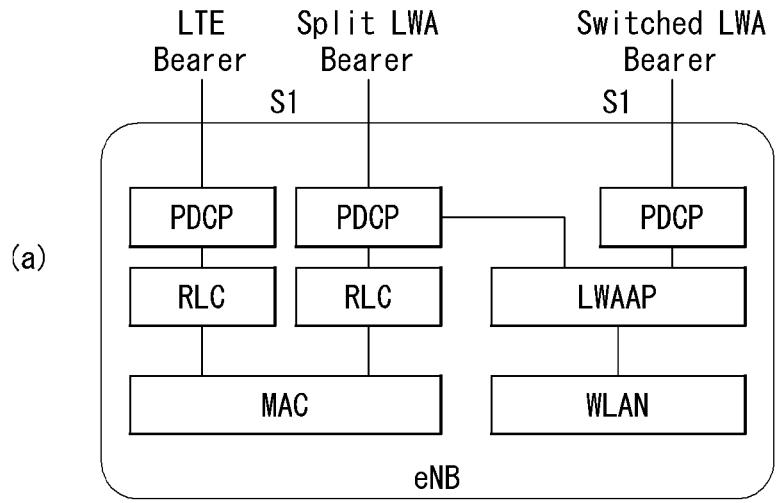
(a)
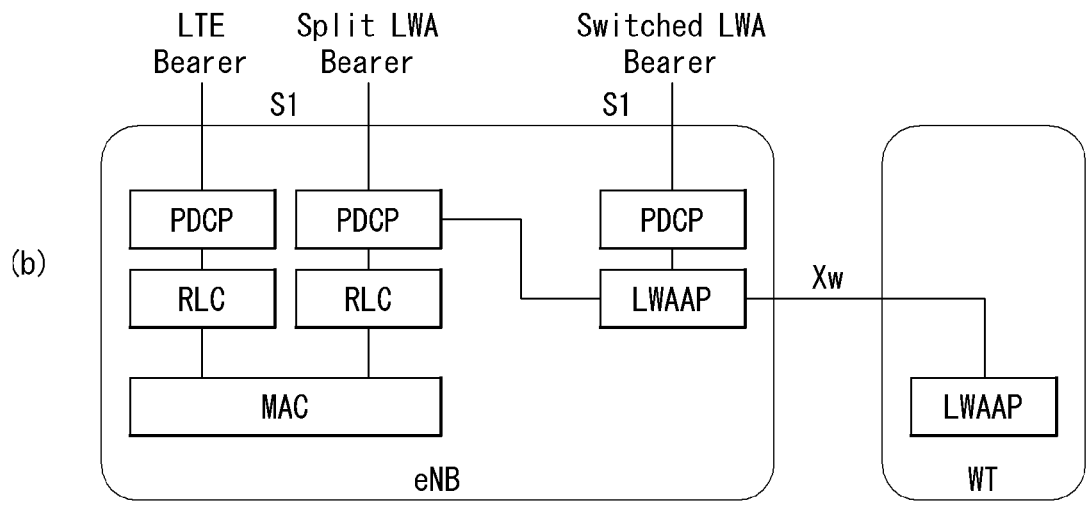
(b)

[Fig. 8]
(a)
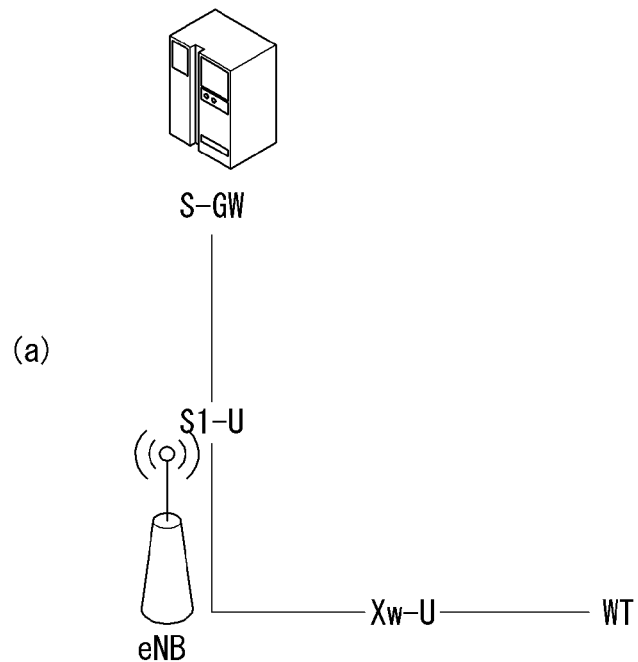
(b)
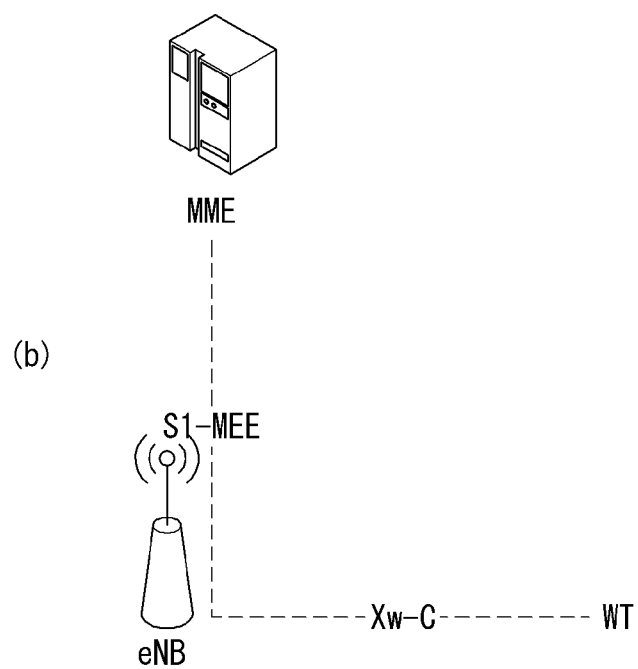

[Fig. 9]
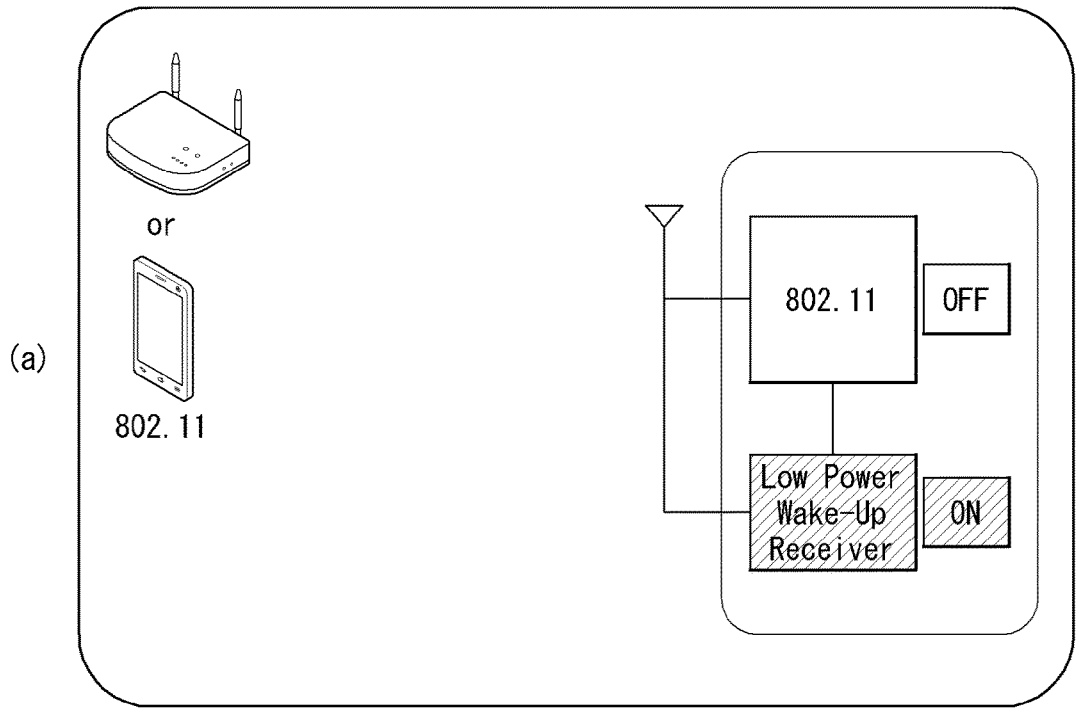
(a)
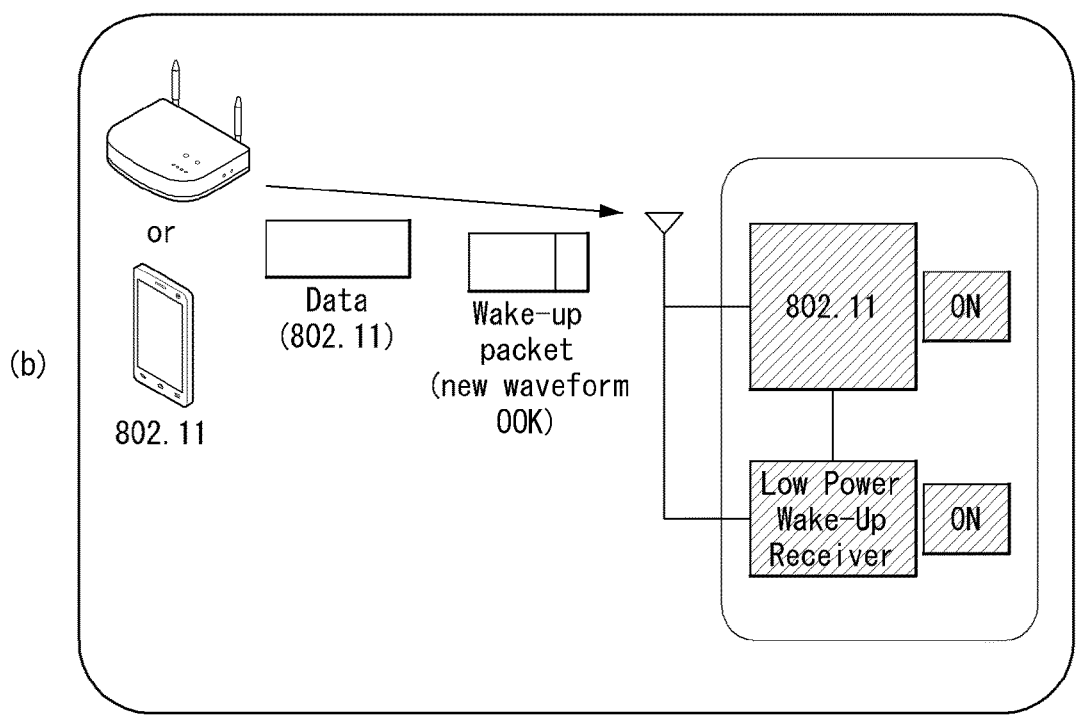
(b)

[Fig. 10]
State transition:power saving mode for category "i"devices
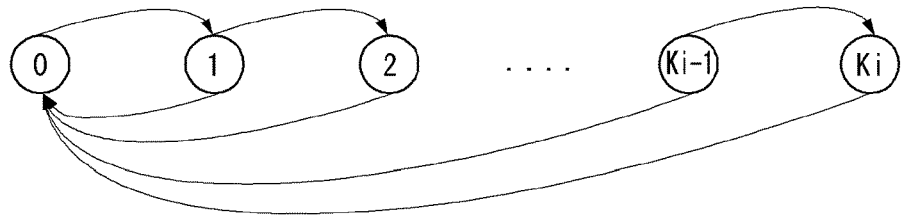
[Fig. 11]
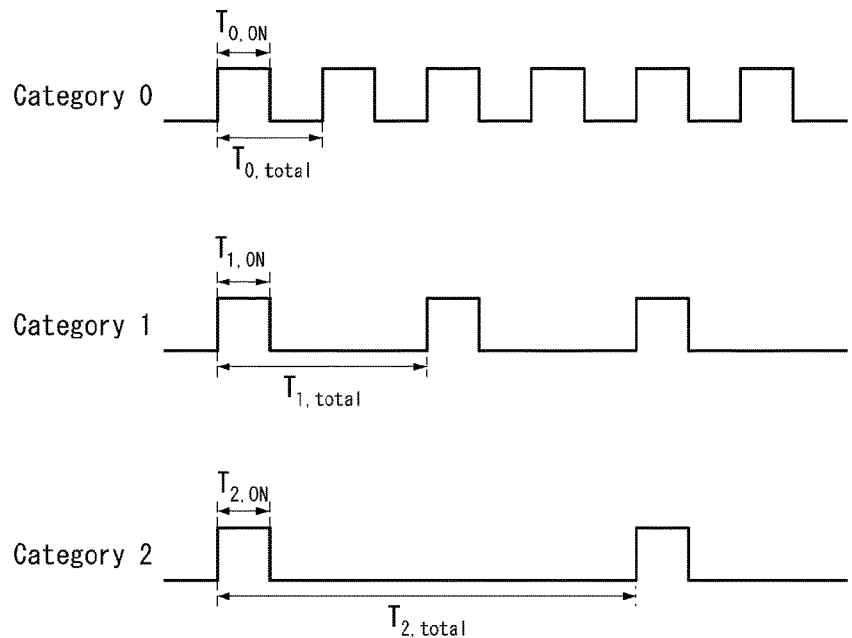
[Fig. 12]
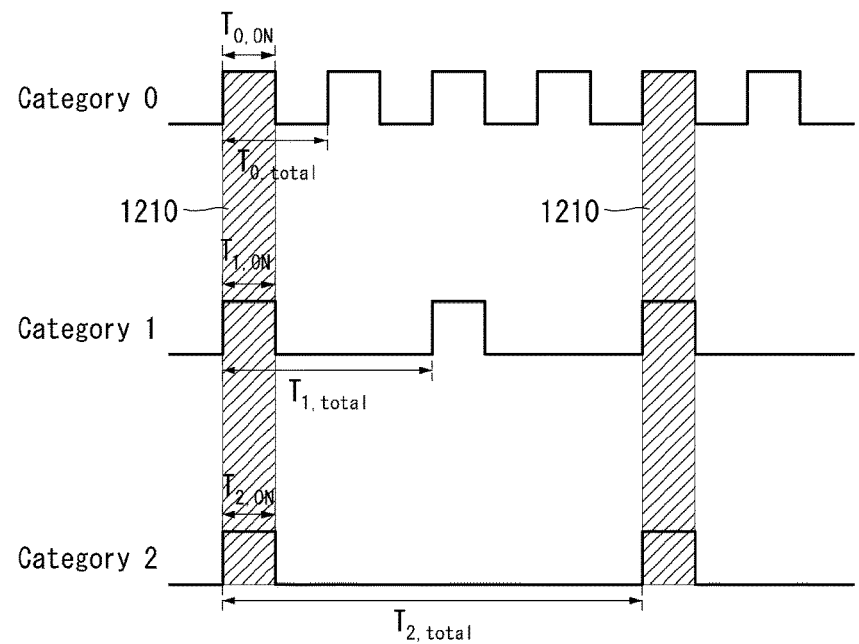

[Fig. 13]
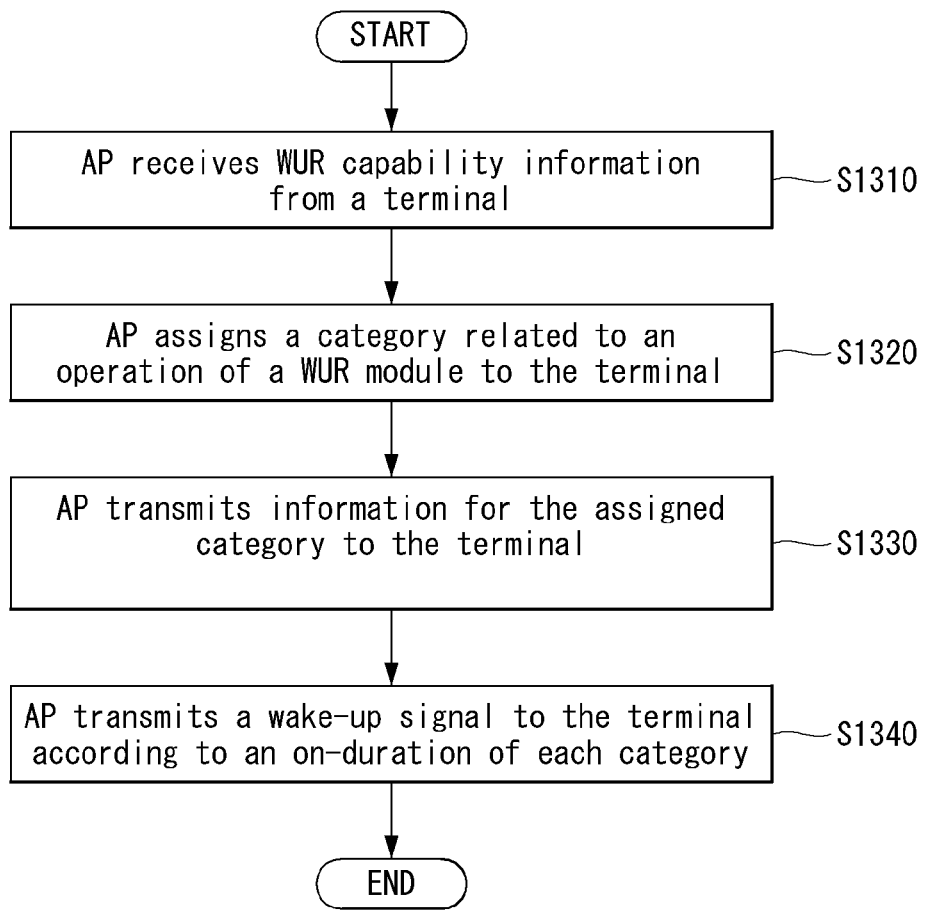

[Fig. 14]
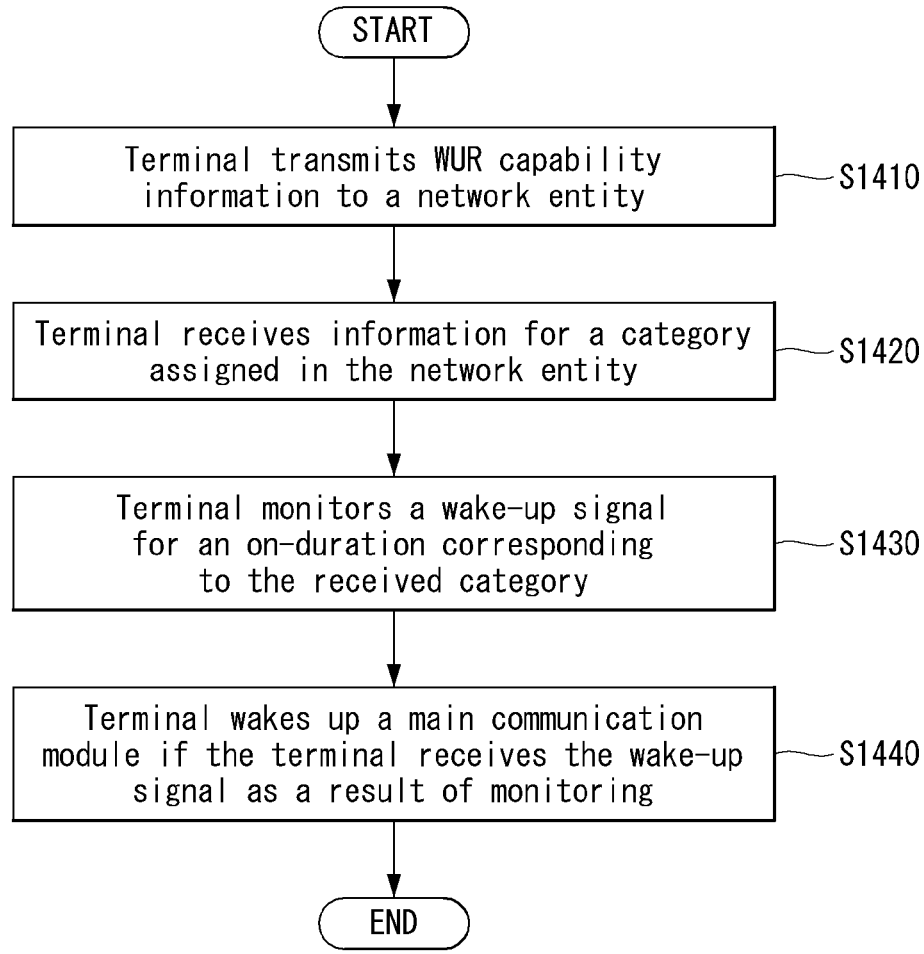
[Fig. 15]
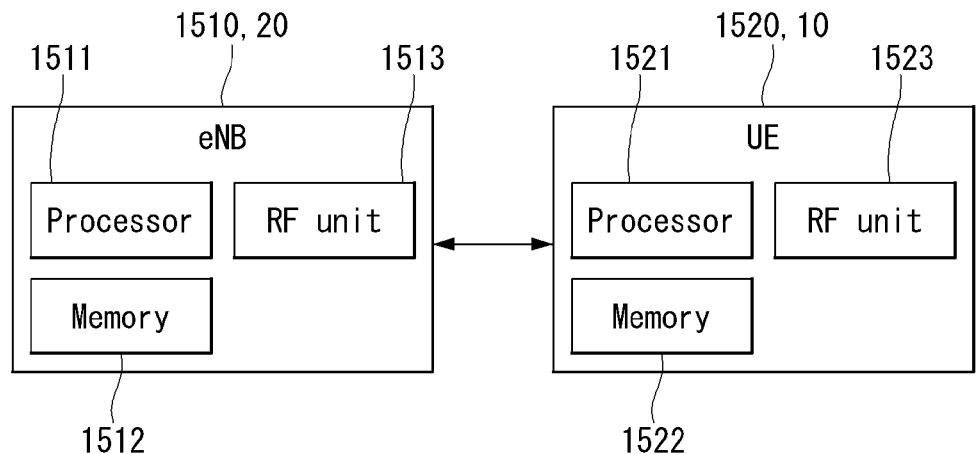

[Fig. 16]
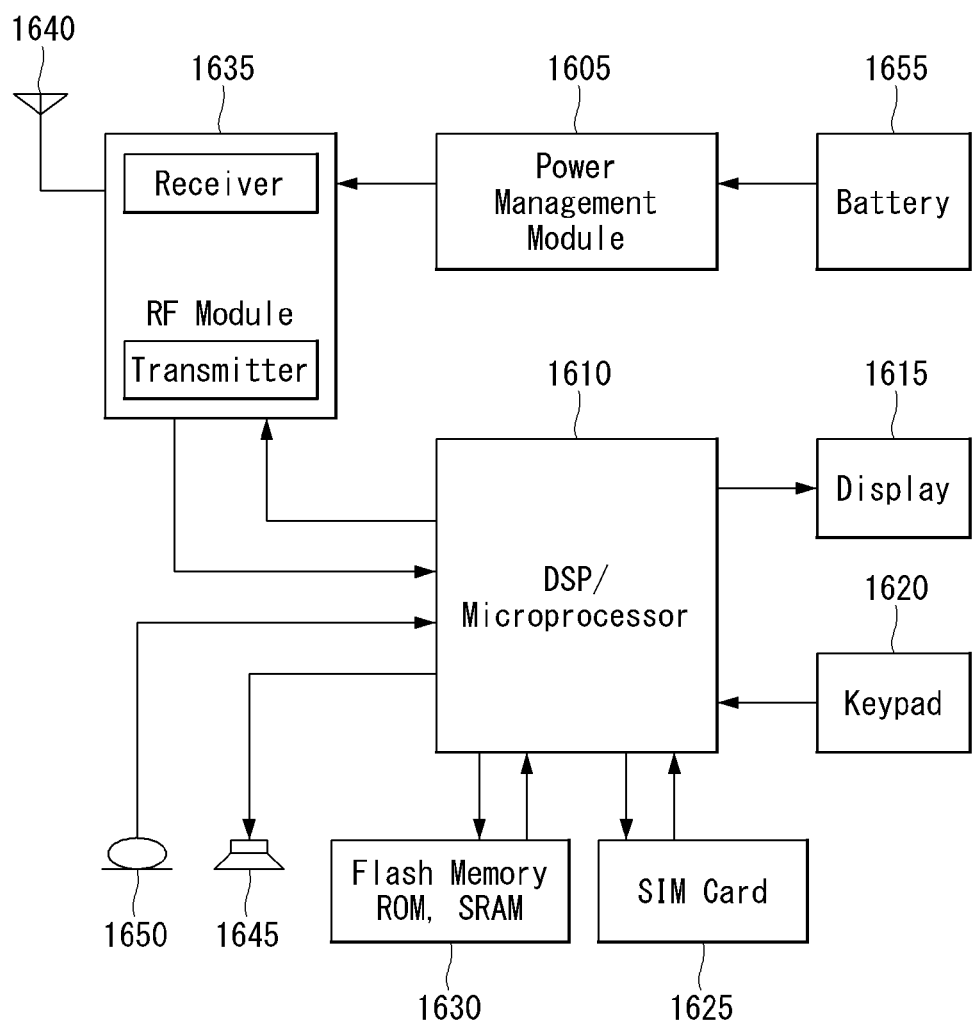

METHOD AND APPARATUS FOR TRANSMITTING AND RECEIVING A WAKE-UP SIGNAL IN A WIRELESS COMMUNICATION SYSTEM

CROSS-REFERENCE TO RELATED APPLICATIONS

This application is the National Stage filing under 35 U.S.C. 371 of International Application No. PCT/KR2018/000172, filed on Jan. 4, 2018, which claims the benefit of U.S. Provisional Application No. 62/510,700, filed on May 24, 2017 and 62/536,428, filed on Jul. 24, 2017, the contents of which are all hereby incorporated by reference herein in their entireties.

TECHNICAL FIELD

The present invention relates to a method for transmitting and receiving a wake-up signal in a wireless communication system and, more particularly, to a method and apparatus for transmitting and receiving the wake-up signal in LTE (Long Term Evolution) WLAN (Wireless Local Area Network) Aggregation (LWA).

BACKGROUND ART

Mobile communication systems have been developed to provide voice services while assuring users' activities and mobility. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support including unlicensed bands, or device networking.

DISCLOSURE

Technical Problem

An aspect of the present specification provides a method for allocating a category related to a power saving mode to a wake-up radio (WUR) device supporting WUR.

Another aspect of the present specification provides a method for reducing power consumption of a WUR device by specifically defining an operation of the WUR device in a power saving mode.

Another aspect of the present specification provides a method for waking up a main communication module of a WUR device in a power saving mode of the WUR device.

Objects to be achieved in this specification are not limited to the aforementioned advantages, and those skilled in the art to which the present invention pertains may evidently understand other objects from the following description.

Technical Solution

This specification provides a method for transmitting a wake-up signal in a wireless communication system supporting a wake-up radio (WUR).

The method performed by a network entity comprises receiving WUR capability information from a terminal; assigning a category related to an operation of a WUR module to the terminal based on the received WUR capability information; transmitting information for the assigned category to the terminal; and transmitting a wake-up signal to the terminal according to an on-duration of each category, wherein the information for the assigned category includes an on-duration and an off-duration, wherein at least one of the on-duration or the off-duration are set same or differently for each category, wherein the wake-up signal is transmitted in on-duration corresponding to each category, wherein the on-duration corresponding to each category has at least one common on-duration that is equally assigned to a plurality of categories.

Furthermore, in this specification, a wake-up signal for wake-up one or more terminals is transmitted in the common on-duration.

Furthermore, in this specification, the wake-up signal further comprises indication information for indicating a plurality of terminals to wake-up or wake-up for one terminal.

Furthermore, in this specification, the wake-up signal further includes terminal identification information for identifying a terminal waking up when the indication information indicates to wake up the one terminal.

Furthermore, in this specification, the indication information is mapped to an index of a golay sequence having a length of 64.

Furthermore, in this specification, the wake-up signal is divided into unicast, multicast, or broadcast according to the set value of the indication information.

Furthermore, in this specification, the assigned category is reassigned to the terminal in the same category or in another category.

Furthermore, in this specification, the assigned category is reassigned considering the state of the terminal.

Furthermore, in this specification, the category is determined based on at least one of a traffic characteristic or a battery state of a terminal.

Furthermore, in this specification, the on-duration and the off-duration of the category assigned to the terminal are changed in units of a predetermined time.

Furthermore, in this specification, the network entity is an access point (AP) or a base station.

Furthermore, this specification provides a method for receiving a wake-up signal in a wireless communication system supporting a wake-up radio (WUR), the method performed by a terminal comprises transmitting WUR capability information to a network entity; receiving information for a category assigned in the network entity; monitoring a wake-up signal for an on-duration corresponding to the received category; and waking up a main communication module if the terminal receives the wake-up signal intended for it as a result of monitoring, wherein the information for the assigned category includes an on-duration and an off-duration, wherein at least one of the on-duration or the off-duration are set same or differently for each category, wherein the wake-up signal is transmitted in on-duration corresponding to each category, wherein the on-duration corresponding to each category has at least one common on-duration that is equally assigned to a plurality of categories.

Furthermore, the main communication module wakes-up when a wake-up signal including information for the terminal is received or when a wake-up signal for waking up a plurality of terminals is received.

Furthermore, this specification further comprises checking whether the received wake-up signal is a signal for waking up the terminal using the information for the terminal when the wake-up signal including information for the terminal is received.

Furthermore, in this specification, the information for the terminal is terminal identification information for identifying the terminal.

Furthermore, in this specification, the main communication module is a 3GPP communication module or a non-3GPP communication module.

Furthermore, in this specification, the terminal is a WUR device having a WUR (Wake Up Radio) module.

Advantageous Effects

The present specification has the effect of reducing power consumption of the WUR device by specifically defining an operation of the WUR device in the power saving mode.

Advantages to be obtained in this specification are not limited to the aforementioned advantages, and those skilled in the art to which the present invention pertains may evidently understand other advantages from the following description.

DESCRIPTION OF DRAWINGS

FIG. 1 illustrates a block diagram illustrating network structure of an evolved universal mobile telecommunication system (E-UMTS).

FIG. 2 illustrates a block diagram depicting architecture of a typical E-UTRAN and a typical EPC.

FIG. 3(a) illustrates the user-plane protocol for the E-UMTS.

FIG. 3(b) illustrates the control-plane protocol stack for the E-UMTS

FIG. 4 illustrates a Structure of the physical channel.

FIG. 5 illustrates a Random Access procedure for E-UTRAN initial access.

FIG. 6 is a diagram showing an example of the network configuration of an LTE WLAN aggregation (LWA) to which an embodiment of the present invention may be applied.

FIG. 7 is a diagram showing an example of the wireless protocol architecture of the LWA to which an embodiment of the present invention may be applied.

FIG. 8 is a diagram showing an example of the connectivity of an eNB and a WT for the LWA to which an embodiment of the present invention may be applied.

FIG. 9(a) is a schematic diagram showing an example of a wake-up operation proposed by an embodiment of the present invention.

FIG. 9(b) is a schematic diagram showing another example of a wake-up operation proposed by an embodiment of the present invention.

FIG. 10 shows an example of a state transition rate diagram of a power-saving mode to which the method proposed in the present specification can be applied.

FIG. 11 shows an example of a category to which the method proposed in the present specification can be applied.

FIG. 12 shows an example of duty cycles for a plurality of WUR devices to which the method proposed in the present specification can be applied.

FIG. 13 is a flowchart illustrating an example of a network entity operation that performs the method proposed in the present specification.

FIG. 14 is a flowchart illustrating an example of a terminal operation that performs the method proposed in the present specification.

FIG. 15 is a block diagram illustrating a wireless device in which methods proposed in the present specification may be implemented.

FIG. 16 illustrates a block diagram of a wireless device according to an example of the present specification.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", next generation NodeB (gNB), a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", a "station (STA)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), LTE-Advanced Pro (LTE-A Pro), 5G New Radio (NR), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. LTE-A Pro is an evolution of 3GPP LTE-A. 5G NR is a revolution of 3GPP LTE-A that will be implemented by OFDMA or its variants.

For the purposes of the present invention, the following terms and definitions apply.

Access Control: the process that checks whether a UE is allowed to access and to be granted services in a closed cell.

Carrier frequency: center frequency of the cell.

Cell: combination of downlink and optionally uplink resources. The linking between the carrier frequency of the downlink resources and the carrier frequency of the uplink resources is indicated in the system information transmitted on the downlink resources.

Cell Group: in dual connectivity, a group of serving cells associated with either the MeNB or the SeNB.

DCN-ID: DCN identity identifies a specific dedicated core network (DCN).

Dual Connectivity: mode of operation of a UE in RRC_CONNECTED, configured with a Master Cell Group and a Secondary Cell Group.

Elementary Procedure: XwAP protocol consists of Elementary Procedures (EPs). An XwAP Elementary Procedure is a unit of interaction between an eNB and WT. An EP consists of an initiating message and possibly a response message. Two kinds of EPs are used:
Class 1: Elementary Procedures with response (success or failure),
Class 2: Elementary Procedures without response.

E-UTRAN Radio Access Bearer (E-RAB): an E-RAB uniquely identifies the concatenation of an S1 Bearer and the corresponding Data Radio Bearer. When an E-RAB exists, there is a one-to-one mapping between this E-RAB and an EPS bearer of the Non Access Stratum.

Frequency layer: set of cells with the same carrier frequency.

FeMBMS: further enhanced multimedia broadcast multicast service.

Handover: procedure that changes the serving cell of a UE in RRC_CONNECTED.

LTE bearer: in LTE-WLAN Aggregation, a bearer whose radio protocols are located in the eNB only to use eNB radio resources only.

LWA bearer: in LTE-WLAN Aggregation, a bearer whose radio protocols are located in both the eNB and the WLAN to use both eNB and WLAN resources.

LWAAP PDU (Protocol Data Unit): in LTE-WLAN Aggregation, a PDU with DRB (Data Radio Bearer) ID (Identification or IDentifier) generated by LWAAP entity for transmission over WLAN.

Master Cell Group: in dual connectivity, a group of serving cells associated with the MeNB, comprising of the PCell and optionally one or more SCells.

Master eNB: in dual connectivity, the eNB which terminates at least S1-MME (mobility management entity).

MBMS-dedicated cell: cell dedicated to MBMS (multimedia broadcast multicast service) transmission. MBMS-dedicated cell is not supported in this release.

MBMS/Unicast-mixed cell: cell supporting both unicast and MBMS transmissions.

FeMBMS/Unicast-mixed cell: cell supporting MBMS transmission and unicast transmission as SCell.

MCG (Master Cell Group) bearer: in dual connectivity, a bearer whose radio protocols are only located in the MeNB (Master eNB) to use MeNB resources only.

Membership Verification: the process that checks whether a UE is a member or non-member of a hybrid cell.

PLMN ID Check: the process that checks whether a PLMN ID is the RPLMN identity or an EPLMN identity of the UE.

Power saving mode: mode configured and controlled by NAS that allows the UE to reduce its power consumption.

Primary PUCCH group: a group of serving cells including PCell (Primary Cell) whose PUCCH signalling is associated with the PUCCH (Physical Uplink Control Channel) on PCell.

Primary Timing Advance Group: Timing Advance Group containing the PCell. In this specification, Primary Timing Advance Group refers also to Timing Advance Group containing the PSCell unless explicitly stated otherwise.

PUCCH group: either primary PUCCH group or a secondary PUCCH group.

PUCCH SCell: a Secondary Cell configured with PUCCH.

RACH-less HO (Handover)/SeNB (Secondary eNB) change: skipping random access procedure during handover or change of SeNB.

Remote UE: a ProSe-enabled Public Safety UE, that communicates with a PDN (Packet Data Network) via a ProSe UE-to-Network Relay.

SCG (Secondary Cell Group) bearer: in dual connectivity, a bearer whose radio protocols are only located in the SeNB to use SeNB resources.

Secondary Cell Group: in dual connectivity, a group of serving cells associated with the SeNB, comprising of PSCell and optionally one or more SCells.

Secondary eNB: in dual connectivity, the eNB that is providing additional radio resources for the UE but is not the Master eNB.

Secondary PUCCH group: a group of SCells whose PUCCH signalling is associated with the PUCCH on the PUCCH SCell.

Secondary Timing Advance Group: Timing Advance Group containing neither the PCell nor PSCell.

Split bearer: in dual connectivity, a bearer whose radio protocols are located in both the MeNB and the SeNB to use both MeNB and SeNB resources.

Split LWA bearer: in LTE-WLAN Aggregation, a bearer whose radio protocols are located in both the eNB and the WLAN to use both eNB and WLAN radio resources.

Switched LWA bearer: in LTE-WLAN Aggregation, a bearer whose radio protocols are located in both the eNB and the WLAN but uses WLAN radio resources only.

Timing Advance Group: a group of serving cells that is configured by RRC and that, for the cells with an UL configured, use the same timing reference cell and the same Timing Advance value.

WLAN Termination: the logical node that terminates the Xw interface on the WLAN side.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signalling to eNodeBs 20, NAS signalling security, AS Security control, Inter CN node signalling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBRFor clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2 is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIGS. 3(a) and 3(b) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 3(a) and 3(b) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3(a), the RLC and MAC layers (terminated in an eNodeB 20 on the network side) may perform functions such as Scheduling, Automatic Repeat Request (ARQ), and Hybrid Automatic Repeat Request (HARQ). The PDCP layer (terminated in eNodeB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling.

The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area and may perform PLMN selection and cell re-selection. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover and inter-RAT cell change order to GERAN with NACC) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

A physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1.0 ms. in length, consists of several symbols. The particular symbol(s) of the sub-frame, such as the first symbol of the sub-frame, can be used for downlink control channel(PDCCH). PDCCHs carries dynamic allocated resources, such as PRBs and MCS.

A transport channel transfers signaling and data between the L1 and MAC layers. A physical channel is mapped to a transport channel.

Downlink transport channel types include a Broadcast Channel (BCH), a Downlink Shared Channel (DL-SCH), a Paging Channel (PCH) and a Multicast Channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming.

The PCH is used for paging a UE. The MCH is used for multicast or broadcast service transmission.

Uplink transport channel types include an Uplink Shared Channel (UL-SCH) and Random Access Channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a Broadcast Control Channel (BCCH), a Paging Control Channel (PCCH), a Common Control Channel (CCCH), a Multicast Control Channel (MCCH) and a Dedicated Control Channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a Dedicated Traffic Channel (DTCH) and a Multicast Traffic Channel (MTCH). The DTCH is a point-to-point channel, dedicated to one UE for the transfer of user information and can exist in both uplink and downlink.

The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

It is known that different cause values may be mapped on the signature sequence used to send messages between a UE and eNB and that either Channel Quality Indicator (CQI) or path loss and cause or message size are candidates for inclusion in the initial preamble.

FIG. 5 illustrates different messages exchanged between a UE and eNB during initial access.

When a UE wishes to access the network and determines a message to be transmitted, the message may be linked to a purpose and a cause value may be determined. The size of the ideal message number 3 illustrated in FIG. 5 may also be determined by identifying all optional information and different alternative sizes, such as by removing optional information, or an alternative "scheduling request" message may be used.

The UE acquires necessary information for the transmission of the preamble, UL interference, Pilot Transmit power and required Signal-to-Noise Ratio (SNR) for the preamble detection at the receiver or combinations thereof. This information must allow the calculation of the initial transmit power of the preamble. It is beneficial to transmit the uplink message in the vicinity of the preamble from a frequency point of view in order to ensure that the same channel is used for the transmission of the message.

The UE should take into account the uplink interference and the uplink path loss in order to ensure that the network receives the preamble with a minimum SNR. The uplink interference can be determined only in the ENodeB and, therefore, must be broadcast by the ENodeB and received by the UE prior to the transmission of the preamble.

The uplink path loss can be considered to be similar to the downlink path loss and can be estimated by the UE from the received Rx (receiver) signal strength when the transmit power of some pilot sequence of the cell is known to the UE.

The required uplink SNR for the detection of the preamble would typically depend on the NodeB configuration, such as a number of Rx antennas and receiver performance.

There may be advantages to transmitting the rather static Transmit power of the pilot and the necessary uplink SNR separately form the varying uplink interference and possibly the power offset required between the preamble and the message.

The initial transmission power of the preamble can be roughly calculated according to the following formula:

Transmit power=TransmitPilot−RxPilot+ULInterference+Offset+SNRRequired.

Therefore, any combination of SNRRequired, ULInterference, TransmitPilot and Offset can be broadcast. In principle, only one value must be broadcast. This is essentially the method in current UMTS systems, although the UL interference in LTE will mainly be neighboring cell interference that is probably more constant than in UMTS.

The UE determines the initial uplink transmit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power for the preamble is not adequate. Another preamble will most likely be transmitted if no acknowledgement or a negative acknowledgement is received by the UE before the next random access attempt. The transmit power of the preamble can be increased, and/or the preamble can be transmitted on a different uplink frequency in order to increase the probability of detection.

Therefore, the actual transmit power of the preamble that will be detected does not necessarily correspond to the initial transmit power of the preamble as initially calculated by the UE.

The UE must determine the possible uplink transport format.

The transport format, which may include Modulation and Coding Scheme (MCS) and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the UE since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the UE according to the received preamble because the UE transmit power compared to the maximum allowed or possible UE transmit power is not known to the eNB, given that the UE will most likely consider the measured path loss in the downlink or some equivalent measure for the determination of the initial preamble transmission power.

The eNB could calculate a difference between the path loss estimated in the downlink compared and the path loss of the uplink. However, this calculation is not possible if power ramping is used and the UE transmit power for the preamble does not correspond to the initially calculated UE transmit power.

Furthermore, the precision of the actual UE transmit power and the transmit power at which the UE is intended to transmit is very low. Therefore, it has been proposed to code the path loss or CQI estimation of the downlink and the message size or the cause value in the uplink in the signature.

FIG. 6 is a diagram showing an example of the network configuration of an LTE WLAN aggregation (LWA) to which an embodiment of the present invention may be applied.

A tremendous increase of mobile data traffics has been witnessed due to proliferation of advanced wireless networks, e.g., long-term evolution (LTE) and long-term evolution advanced (LTE-Advanced) networks and smart devices, e.g., smart phones, and tablets.

New services and applications will be kept being introduced based on those successful technological achievements, thus there is no doubt that the trend in mobile traffic increase will require major breakthroughs in near future. Even though advances in cellular technology, e.g., LTE, LTE-Advanced, etc., have enhanced the performance and capacity of mobile networks, it will not be sufficient to meet the mobile data demand with exponential growth rate.

The usage of unlicensed spectrum provides an attractive opportunity for operators to help support their subscribers by increasing network data capacity.

Recent research and development (R&D) and standardization efforts have been focused to aggregate heterogeneous LTE and LTE-Advanced networks, and wireless local area network (WLAN) so as to provide increased throughput using unlicensed spectrum and relieve congestion by off-loading of cellular data through WLAN.

Two interworking features are defined in 3GPP: LTE WLAN Aggregation (LWA) and LTE WLAN Radio Level Integration with IPsec Tunnel (LWIP).

In LWA, data aggregation is performed at the radio access network where eNB schedules packets to be transmitted on LTE and WLAN radio links. The advantage of data aggregation at the radio access network (RAN) is that no changes in core network are needed. Main difference between LWA and LWIP lies in who has the control of WLAN.

In LWA, cellular operators have control on WLAN, while customers other than operators have the control of WLAN in LWIP.

E-UTRAN supports LTE-WLAN aggregation (LWA) operation whereby a UE in RRC_CONNECTED is configured by the eNB to utilize radio resources of LTE and WLAN. Two scenarios are supported depending on the backhaul connection between LTE and WLAN:

non-collocated LWA scenario for a non-ideal backhaul;
collocated 6WA scenario for an ideal/internal backhaul;

As shown in FIG. 6, the LWA network includes a WLAN termination (WT) unlike LTE or LTE-A. An eNB and a WT are connected through an Xw interface, that is, a new interface, for control information and data transmission/reception. A WLAN Termination (WT) terminates the Xw interface for a WLAN.

In this case, the WT may be defined as follows.

WT: handles multiple APs, forward data to which AP; WT also notifies eNB that a served terminal has WUR (Wake-Up Receiver). eNB asks WT to wake up the terminal through a related AP.

In an embodiment of the present invention, a WT may be included in an eNB or an AP. That is, the function of the WT may be performed by the eNB or the AP.

FIG. 7 is a diagram showing an example of the wireless protocol architecture of an LTE WLAN aggregation (LWA) to which an embodiment of the present invention may be applied.

In LWA, the radio protocol architecture that a particular bearer uses depends on the LWA backhaul scenario and how the bearer is set up. Two bearer types exist for LWA: split LWA bearer and switched LWA bearer.

The split LWA bearer may transfer LTE data and Wi-Fi data to an RLC layer or an LWAAP layer. That is, the split LWA bearer transfers received LTE data to the RLC layer when the LTE data is received from a higher layer and transfers received Wi-Fi data to the LWAAP layer when the Wi-Fi data is received from a higher layer.

FIG. 7(a) shows an example of LWA wireless protocol architecture for a collocated scenario, and FIG. 7(b) shows an example of LWA wireless protocol architecture for a non-collocated scenario.

For PDUs sent over WLAN in LWA operation, the LTE-WLAN Aggregation Adaptation Protocol (LWAAP) entity generates LWAAP PDU containing a dedicated radio bearer (DRB) identity and the WT uses the LWA EtherType 0x9E65 for forwarding the data to the UE over WLAN. The UE uses the LWA EtherType to determine that the received PDU belongs to an LWA bearer and uses the DRB identity to determine to which LWA bearer the PDU belongs to.

In the downlink, the PDCP sublayer of the UE supports in-sequence delivery of upper layer PDUs based on the reordering procedure introduced for DC. In the uplink, PDCP PDUs can only be sent via the LTE.

The UE supporting LWA may be configured by the eNB to send PDCP status report or LWA status report, in cases where feedback from WT is not available.

Only RLC AM can be configured for an LWA bearer.

E-UTRAN does not configure LWA with DC, LWIP or RAN Controlled LTE-WLAN Interworking (RCLWI) simultaneously for the same UE.

If LWA- and RAN-assisted WLAN interworkings are simultaneously configured for the same UE, in RRC Connected, the UE only applies LWA.

For LWA bearer UL configuration, if the data available for transmission is equal to or exceeds the threshold indicated by E-UTRAN the UE decides which PDCP PDUs are sent over WLAN or LTE. If the data available is below the threshold, the UE transmits PDCP PDUs on LTE or WLAN as configured by E-UTRAN.

For each LWA DRB, E-UTRAN may configure the IEEE 802.11 AC value to be used for the PDCP PDUs that are sent over WLAN in the uplink.

For LWA bearer, for routing of UL data over WLAN the WT MAC address may be provided to the UE by the E-UTRAN or using other WLAN procedure.

FIG. 8 is a diagram showing an example of the connectivity of an eNB and a WT for an LTE WLAN aggregation (LWA) to which an embodiment of the present invention may be applied.

FIG. 8(a) shows an example of a network interface in a user plane, and FIG. 8(b) shows an example of a network interface in a control plane.

In the non-collocated LWA scenario, the eNB is connected to one or more WTs via an Xw interface. In the collocated LWA scenario the interface between LTE and WLAN is up to implementation. For LWA, the only required interfaces to the Core Network are S1-U and S1-MME which are terminated at the eNB. No Core Network interface is required for the WLAN.

User Plane

In the non-collocated LWA scenario, the Xw user plane interface (Xw-U) is defined between eNB and WT. The Xw-U interface supports flow control based on feedback from WT.

The Flow Control function is applied in the downlink when an E-RAB is mapped onto an LWA bearer, i.e. the flow control information is provided by the WT to the eNB for the eNB to control the downlink user data flow to the WT for the LWA bearer. The OAM configures the eNB with the information of whether the Xw DL delivery status provided from a connected WT concerns LWAAP PDUs successfully delivered to the UE or successfully transferred toward the UE.

The Xw-U interface is used to deliver LWAAP PDUs between eNB and WT.

For LWA, the S1-U terminates in the eNB and, if Xw-U user data bearers are associated with E-RABs for which the LWA bearer option is configured, the user plane data is transferred from eNB to WT using the Xw-U interface.

FIG. 8(a) shows U-plane connectivity of eNB and WT involved in LWA for a certain UE: the S1-U is terminated at the eNB; the eNB and the WT are interconnected via Xw-U.

Control Plane

In the non-collocated LWA scenario, the Xw control plane interface (Xw-C) is defined between eNB and WT. The application layer signaling protocol is referred to as Xw-AP (Xw Application Protocol).

The Xw-AP protocol supports the following functions:
Transfer of WLAN metrics (e.g., BSS load) from WT to eNB;
Support of LWA for UE in ECM-CONNECTED:
Establishment, Modification and Release of a UE context at the WT;
Control of user plane tunnels between eNB and WT for a specific UE for LWA bearers.
General Xw management and error handling functions:
Error indication;
Setting up the Xw;
Resetting the Xw;
Updating the WT configuration data.

eNB-WT control plane signaling for LWA is performed by means of Xw-C interface signaling.

There is only one S1-MME connection per LWA UE between the eNB and the MME. Respective coordination between eNB and WT is performed by means of Xw interface signaling.

FIG. 8(b) shows C-plane connectivity of eNB and WT involved in LWA for a certain UE: the S1-MME is terminated in eNB; the eNB and the WT are interconnected via Xw-C.

FIG. 9 is a schematic diagram showing an example of a wake-up operation proposed by an embodiment of the present invention.

Referring to FIG. 9, if data is to be transmitted/received using an LWA, only a Wi-Fi module may be activated only when data is generated and the data may be transmitted/received.

Specifically, if data is to be transmitted/received through Wi-Fi, although there is no data transmission/reception, power consumption of a UE is increased if a Wi-Fi module is always activated (or ON).

Accordingly, in order to reduce power consumption of the UE, there is a need for a method for activating the Wi-Fi module only if data transmission/reception is present and deactivating the Wi-Fi module while there is no data transmission.

Such a method is hereinafter called a wake-up radio (WUR).

In order to apply the WUR method, a UE may include a separate low power module (hereinafter referred to as a "WUR module") for receiving a packet (hereinafter referred to as a "Wake-Up Packet") for activating a WLAN module when the WLAN module is a deactivation state in addition to a WLAN module (or Wi-Fi Module).

The low power module for receiving a Wake-Up Packet may operate in low power (e.g., 100 uw), and may receive a Wake-Up Packet from another device and activate a WLAN module.

A WUR technology is one of the green technologies since it can prevent the waste of power when it is not necessarily required.

FIG. 9 shows the overall description of a WUR operation.

WLAN module (or Wi-Fi Module) will totally be turned off when no data is transmitted and received (this status is called "OFF" in which WLAN module (or Wi-Fi Module) is off but WUR module is on).

If there is the data for UE with specific WLAN module identity, for example medium-access control identification (MACID), association identification (AID), then access point (AP) sends "wake-up" signal (or packet) to it before actual data is delivered.

Wake-up module in UE keeps looking for the presence of wake-up signal coming and, if it is detected, then WLAN module will be wake up and WUR module will be off.

More specifically, in FIG. 9(*b*), the WUR module of the terminal is in ON state and the Wi-Fi module is in OFF state before the terminal receives the wake-up signal.

Then, when the terminal receives the wake-up signal through the WUR module in the ON state, the WUR module wakes up the Wi-Fi module and enters into its OFF state.

The length of WLAN module "OFF" period in WUR will be much longer than that of sleep-mode currently defined and thus much power can be saved.

Due to the massive and widespread of communications devices, power consumption has been of great concern to consider. This concern will be further deepened when Internet of Things (IoT) comes into play. One of the important requirements for IoT devices is to provide very low power consumption so that multi-year operation is possible with no battery change.

Wake-up radio (WUR) is being considered in IEEE 802 community due to its much reduced power consumption when primary connectivity WLAN radio is expected inactive. When there is a need to utilize the primary WLAN radio, a small packet called "wake-up packet" is transmitted. Since WUR is assumed "always-on", it can detect and decode wake-up packet and will request the WLAN module to wake-up to process the data that will follow. Note that WUR can be implemented both on access point (AP) and station (STA).

Even though WUR consumes less power than the case when primary WLAN module is on, there are many cases where very infrequent wake-up packet transmissions are expected. In these cases, "always-on" operation of WUR will waste unnecessary power.

The concept of WUR can be extended to other technologies, e.g., LTE, LTE-Advanced, LTE-Advanced Pro, 5G standards, etc.

WUR technology is one of the green technologies since it can prevent the waste of power when it is not necessarily required.

Hereinafter, matters related to a power saving mode operation of the WUR device proposed in this specification will be described in detail.

The power saving mode operation of the WUR device can be changed based on the statistics of incoming wake-up packets.

The STA described in this specification may be expressed as user equipment (UE), terminal, WUR device, mobile station, device, and the like.

In addition, the WUR device may operate in a power saving mode to save power.

The WUR device, an H/W module implemented in an STA, may refer to a WUR module itself or the STA.

In this manner, the WUR device may be categorized on the basis of a specific reference to implement the power saving mode.

For example, supported traffic characteristics such as relatively regular traffic versus relatively intermittent traffic, relatively small amount of data traffic versus relatively large amount of data traffic, and the like, may be one of the specific references In another example, the WUR device may be categorized by class of an STA to which WUR is attached.

For example, in case where an STA is premium, a category having a frequent ON duration may be allocated to the STA in order to minimize delay that may occur due to the use of WUR in the power saving mode.

Here, a specific category may have one or multiple power saving modes, and one power saving mode may include at least one ON duration and at least one OFF duration.

FIG. 11 shows an example of a category to which the method proposed in the present specification can be applied.

In another example, the WUR device may be categorized on the basis of availability of power.

For example, in case where the STA is connected to a power outlet, power consumption is less important, and thus, a category having a frequent ON duration may be allocated to the STA.

In case where the STA operates by a battery as in most of IoT devices, a category having an infrequent ON duration may be allocated to the STA.

Also, in case where a condition used for determining a category is changed, the category allocated to the STA may be changed accordingly.

In case where an AP wants to change a category allocated to a specific STA, the AP may transmit intention and content (new category related information) to the specific STA when WUR regarding the specific STA is 'ON'.

Different or the same 'ON' duration and/or different or the same 'OFF' duration may be allocated to the WUR device in different categories.

In this specification, 'A and/or B' may mean that "it includes at least one of A or B".

In case where multiple power saving modes are defined in the same category, different sets of the power saving mode may be defined on the basis of frequency of 'ON' duration.

For example, a ratio of 'ON' and 'OFF' duration in one power saving mode may be 1:2, and a ratio of 'ON' and 'OFF' duration in another power saving mode may be 1:3.

First, a category allocated to the WUR device and a power saving mode defined or operated in the corresponding category will be described in detail.

A set of parameters regarding category i is defined as expressed by Equation 1 below.

$$D_i = \{d_i^0, d_i^1, \ldots, d_i^{K_i}\}$$
$$T_i = \{T_i^0, T_i^1, \ldots, T_i^{K_i}\} \quad \text{[Equation 1]}$$

Here, i denotes an index of category and $d_i^j$ denotes a jth power saving mode defined for device(s) allocated to category i.

$d_i^0$ denotes a first power saving mode which can be "always-on" or a specific ratio of "ON" duration and "OFF" duration.

For example, $d_i^0$ is 90% of "ON" time (or duration) and 10% of "OFF" time (or duration).

$T_i^j$ denotes time duration while the WUR device included in the category i is in the jth power saving mode when no wake-up packet is received.

For the convenience of operation, $T_i^j$ may have the same value for every i and j.

Here, each power saving mode may maintain the same time duration.

FIG. 10 shows an example of a state transition rate diagram of a power-saving mode to which the method proposed in the present specification can be applied.

That is, FIG. 10 illustrates a state transition rate diagram between power saving modes regarding WUR devices with category i allocated thereto.

Regarding state i not equal to 0, when the WUR device detects traffic, the state is transferred to state 0 and the corresponding state is "always ON".

Hereinafter, various methods regarding an operation of the STA in the power saving mode, i.e., an operation of the STA to implement the power saving mode, will be described.

First Embodiment

A first embodiment relates to a case where each category has multiple duty cycles.

The first embodiment may be classified as method 1 and method 2 according to a mode transition method.

(Method 1)

In the method 1, transition between duty cycle modes (or power saving modes) is sequentially (or stepwise) changed (or updated or increased).

Here, the stepwise updating refers to that the category i having a power saving mode "j" which has transitioned from 1 is increased to a next power saving mode (i.e., j+1) by a single step.

Here, duty cycles (ON-duration and OFF-duration) of the jth power saving mode and the (j+1)th power saving mode may be different.

In detail, the WUR device starts in the power saving mode having $d_i^0$.

The WUR device observes or checks whether wake-up packets are present or a wake-up packet is received during a period of $T_i^0$.

If the WUR device fails to receive the wake-up packet during the period of $T_i^0$, the WUR device shifts the power saving mode having $d_i^0$ to $d_i^1$ and resets a timer $T_i^1$.

Here, $T_i^1$ may refer to a period or duration of the power saving mode having $d_i^1$.

If the WUR device receives a wake-up packet during the period of $T_i^0$, the WUR device maintains the power saving mode of $d_i^0$ and resets the corresponding timer to $T_i^0$.

This may be generalized as follows.

That is, if the WUR device fails to receive any wake-up packet during $T_i^j$ in the jth power saving mode $d_i^j$, the WUR device shifts (or transitions) the power saving mode of $d_i^j$ to a power saving mode $d_i^{j+1}$ and resets the timer to $T_i^{j+1}$.

Also, if the WUR device receives the wake-up packet during the period of $T_i^j$ in the jth power saving mode $d_i^j$, the WUR device falls back the power saving mode of $d_i^j$ to $d_i^k$ and resets the timer to $T_i^k$.

Here, k is index "0" or a value smaller than j.

Parameter values for the states may be updated on the basis of collected traffic statistics.

(Method 2)

In the method 2, transition between duty cycle modes is randomly changed.

Here, a duty cycle mode may refer to a power saving mode.

In case where a certain cause requesting mode transition is present, a to-be-changed or next power saving mode may be randomly selected by a specific (or pre-defined) probability or tendency measure.

The specific probability or tendency measure may be adjusted on the basis of various factors.

The method 2 will be described in detail.

First, $P_i$ is defined as expressed by Equation 2 below.

$$P_i = \{p_i^0, p_i^1, \ldots, p_i^{K_i}\} \quad \text{[Equation 2]}$$

Here, $p_i^j$ is a probability in which the jth power saving mode (i.e., a current power saving mode is "j") defined for the WUR devices allocated to category i is selected.

Each element $(p_i^0, p_i^1, \ldots, p_i^{K_i})$ of $P_i$ is initialized with the same probability of $$\frac{1}{K_i + 1}.$$

Thereafter, the power saving mode starts by random selection (e.g., $d_i^j$).

Also, the WUR device observes or checks whether wake-up packets are present during the period of $T_i^j$.

If the WUR device fails to receive a wake-up packet during the period of $T_i^j$, (1) probability distribution (mode transition probability vector) is adjusted. Also, (2) one of power saving modes greater than j is randomly selected on the basis of the probability distribution.

If the WUR device receives wake-up packets during the period of $T_i^j$, (1) probability distribution (mode transition probability vector) is adjusted. Also, (2) a power saving mode is randomly selected on the basis of a probability distribution.

Here, step (2) may be performed before step (1).

Second Embodiment

Another embodiment for implementing a power saving mode regarding the WUR device will be described.

The second embodiment relates to a fixed duty cycle operation.

That is, each category has a fixed duty cycle.

However, every category has a common "ON-time" slot for commonly waking up to scan incoming WUR signals.

As discussed above, the WUR devices may be categorized on the basis of a specific reference.

A ratio ($T_i$) of Ti,ON and Ti,total durations regarding category i may be defined as expressed by Equation 3 below.

$$T_i \equiv \frac{T_{i,ON}}{T_{i,total}} \quad \text{[Equation 3]}$$

The same Ti,ON may be allocated to every WUR device at the same time instance.

Referring to FIG. 11, Ti may be considered as a duty cycle regarding WUR devices in the category i. A ratio of T0 and T1 may be defined as an integer multiple as expressed by Equation 4 below.

$$\frac{T_0}{T_1} = \frac{T_{1,total}}{T_{0,total}} \equiv \alpha \quad \text{[Equation 4]}$$

Each category has a predefined cycle configuration (T_ON and T_total regarding each category are fixed or predefined)

FIG. 12 shows an example of duty cycles for a plurality of WUR devices to which the method proposed in the present specification can be applied.

That is, FIG. 12 illustrates an example of duty cycles for a plurality of WUR devices having a common "ON-time" slot.

In FIG. 12, the shaded portions 1210 represent the common "ON-time" slot.

A notification (or announcement) regarding information of the common "ON-time" slot may be defined or transmitted by an AP.

The AP may update the information of the common "ON-time" slot (e.g., length of (longest) T_total).

A duty cycle of Ti is allocated to a WUR device determined to be included in the category i.

The WUR device receives a WUR-related signal such as wake-up signal, system information, and the like, during Ti,ON. The WUR-related signal may be a beacon interval defined in WLAN.

Referring to FIG. 12, it can be seen that WUR devices allocated to different categories or different power save modes in the same category have the common "ON" duration.

When it is required to wake up one or more WUR devices allocated to different categories, a multicast wake-up signal or a broadcast wake-up signal may be transmitted in the common "ON" duration of different categories.

A reception operation of an STA allocated to category i may be summarized as follows.

The STA may check whether a wake-up signal is transmitted from the AP during the "ON" period (or duration) regarding the category i.

If the STA detects transmission of the wake-up signal from the AP, the STA checks whether the corresponding wake-up signal was intended for the STA.

If an ID of the STA is detected from the wake-up signal, the STA wakes up a main WLAN module.

If a multicast ID is detected from the wake-up signal, the STA may check whether a group ID of a group to which the STA belongs is detected as follows.

When a group ID of the group to which the STA belongs is detected from the wake-up signal, the STA wakes up the main WLAN module.

If the group ID of the group to which the STA belongs is not detected from the wake-up signal, the STA maintains a previously allocated power saving mode.

If a broadcast ID is detected from the wake-up signal, the STA wakes up the main WLAN module.

Also, in order to implement identification information (identifier (ID)) in the wake-up signal, two methods of (1) Physical-layer Approach and (2) Mac-layer Approach may be considered.

Physical-Layer Approach

First, physical-layer approach will be described.

In an example of the physical-layer approach, predetermined sequences may be mapped to IDs regarding a specific field (e.g., preamble).

For example, $\text{Golay}_{64}^{1}$ may be mapped to a broadcast ID and $\text{Golay}_{64}^{32}$ may be mapped to a multicast ID.

Here, $\text{Golay}_{64}^{1}$ indicates a Golay sequence corresponding to a first index having a length of 64.

Golay Sequence

For the purposes of description, the Golay sequence will be briefly described.

The Golay complementary sequence, a pair of binary codes which belongs to a family of larger signals called a complementary pair, includes two codes having the same length n, and an auto-correlation function has the same side-lobe in magnitude but has the opposite side-lobe in sign.

When two codes are added, a composite auto-correlation function in which a peak is 2n and the side-lobe is 0 is generated.

A method for calculating the Golay sequence will be described with reference to the following equations.

Variables ai and bi (i=1, 2, . . . , n) are set as elements of a complementary set having two lengths n such as +1 or −1.

$$A = a1, a2, \ldots, an$$

$$B = b1, b2, \ldots, bn \quad \text{[Equation 5]}$$

An ordered pair (A, B) become the Golay sequences having the length n if polynomials associated to the ordered pair satisfy Equation 6 below.

$$A(x) = a_1 + a_2 x + \ldots + a_n x^{n-1}$$

$$B(x) = b_1 + b_2 x + \ldots + b_n x^{n-1} \quad \text{[Equation 6]}$$

Also, identity is satisfied as expressed by Equation 7 below.

$$A(x)A(x^{-1}) + B(x)B(x^{-1}) = 2 \quad \text{[Equation 7]}$$

In laurent polynomial ring Z[x, x−1], auto-correlation function NA and NB, respectively corresponding to sequence A and sequence B are defined by Equation 8 below.

$$N_A(j) = \Sigma_{i \in Z} a_i a_{i+j}$$

$$N_B(j) = \Sigma_{i \in Z} b_i b_{i+j} \quad \text{[Equation 8]}$$

Here, in the case of $k \not\in (1, \ldots, n)$, a set ak is 0 (ak=0). Equation 9 below may be replaced by the sum of NA and NB.

$$N_A(j) + N_B(j) = \begin{cases} 2N, & j = 0 \\ 0, & j \neq 0 \end{cases} \quad \text{[Equation 9]}$$

The sum of two auto-correlation functions is 2N when j=0, or 0 when j is not 0.

MAC-Layer Approach

Hereinafter, the Mac-layer approach will be described.

In order to designate an intended receiver of a wake-up signal, a predetermined number of bits is placed in a specific field such as a preamble.

For example, in order to materialize unicast or multicast/broadcast wake-up signals, 2 bits are used in a specific field such as the preamble.

For example, '00' may be set to unicast, '01' may be set to multicast, '10' may be set to broadcast, and '11' may be set to be reserved.

First, when the STA detects a specific field set to '00', the STA checks a unicast ID as follows.

If the checked unicast ID is an ID of the STA, the STA wakes up the main WLAN module.

If the checked unicast ID is not the ID of the STA, the STA follows a previously allocated power saving mode.

When the STA detects a specific field set to '01', whether a group ID of a group to which the STA belongs is detected is checked as follows.

When the group ID is detected, the STA wakes up the main WLAN module.

When the group ID is not detected, the STA follows the previously allocated power saving mode.

Also, when the STA detects a specific field set to '10', the STA wakes up the main WLAN module.

FIG. 13 is a flowchart illustrating an example of a network entity operation that performs the method proposed herein.

The network entity can be an access point or a base station.

Hereinafter, for convenience of explanation, the network entity will be described as the AP.

At first, an access point (AP) receives WUR capability information from a terminal (S1310).

As mentioned above, the terminal can be represented a WUR device, a STA, a UE, etc.

Thereafter, the AP assigns a category related to an operation of a WUR module to the terminal based on the received WUR capability information (S1320).

Referring to FIG. 9, the WUR module (or Wake-Up Receiver) is implemented in the terminal.

Thereafter, the AP transmits information for the assigned category to the terminal (S1330).

Thereafter, the AP transmits a wake-up signal to the terminal according to an on-duration of each category (S1340).

Here, the information for the assigned category can include an on-duration and an off-duration.

The information for the assigned category can further include a reference time that can be used to calculate a next available starting time of an on-duration.

Also, at least one of the on-duration or the off-duration can be set same or differently for each category.

For example, for each category, the on-duration may be the same, but off-duration may be different, or vice versa.

Also, the wake-up signal can be transmitted in on-duration corresponding to each category.

Here, the on-duration corresponding to each category can have at least one common on-duration that is equally assigned to a plurality of categories.

Also, the each category can have a plurality of power save modes including at least one a common on-duration.

Also, a wake-up signal for wake-up one or more terminals can be transmitted in the common on-duration.

The wake-up signal further comprises indication information for indicating a plurality of terminals to wake-up or wake-up for one terminal.

Here, the indication information can be mapped to an index of a Golay sequence having a length of 64.

Or, the indication information can be represented 2 bits, and the wake-up signal can be divided into unicast, multicast, or broadcast according to the set value of the indication information.

The wake-up signal further includes terminal identification information for identifying a terminal waking up when the indication information indicates to wake up the one terminal.

Here, the terminal identification information can draw (or can be selected) from a subset of MAC ID or AID (Association ID) of the terminal. The assigned category can be reassigned to the terminal in the same category or in another category.

The assigned category can be reassigned considering the state of the terminal.

Here, the category can be determined based on at least one of a traffic characteristic or a battery state of a terminal.

The on-duration and the off-duration of the category assigned to the terminal can be changed in units of a predetermined time.

The network entity is an access point (AP) or a base station.

FIG. 14 is a flowchart illustrating an example of a terminal operation that performs the method proposed herein.

At first, the terminal transmits WUR capability information to a network entity (S1410).

Here, the network entity can be a base station, an access point, etc.

Thereafter, the terminal receives information for a category assigned in the network entity (S1420).

Thereafter, the terminal monitors a wake-up signal for an on-duration corresponding to the received category (S1430).

Thereafter, the terminal wakes up a main communication module if the terminal receives the wake-up signal as a result of monitoring (S1440).

Here, the main communication module can be a 3GPP communication module or a non-3GPP communication module.

Specifically, the main communication module can be a WLAN module.

The information for the assigned category can include an on-duration and an off-duration.

Also, the information for the assigned category further include

Also, at least one of the on-duration or the off-duration can be set same or differently for each category.

Also, the wake-up signal can be transmitted in on-duration corresponding to each category.

Also, the on-duration corresponding to each category can have at least one common on-duration that is equally assigned to a plurality of categories.

Also, the main communication module can be waken-up when a wake-up signal including information for the terminal is received or when a wake-up signal for waking up a plurality of terminals is received.

Also, the terminal checks whether the received wake-up signal is a signal for waking up the terminal using the information for the terminal when the wake-up signal including information for the terminal is received.

The information for the terminal can be terminal identification information for identifying the terminal.

The terminal can be a WUR device having a WUR (Wake Up Radio or Wake Up Receiver) module.

For facilitating the category management, the same category with a plurality of power save modes can be assigned to all AP's.

FIG. 15 is a block diagram illustrating a wireless device in which methods as proposed herein may be implemented.

In this case, the wireless device may be a BS, UE, WT, AP, MME or a network entity.

As shown in FIG. 15, the network entity 1510 and the UE 1520 include communication units (transmitting/receiving units, RF units (or RF module), 1513 and 1523), processors 1511 and 1521, and memories 1512 and 1522.

The network entity and the UE may further input units and output units.

The communication units 1513 and 1523, the processors 1511 and 1521, the input units, the output units, and the memories 1512 and 1522 are operatively connected with each other in order to conduct the methods as proposed herein.

The communication units (transmitting/receiving units or RF units, 1513 and 1523), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1511 and 1521 implement functions, procedures, and/or methods as proposed herein. The layers of radio interface protocols may be implemented by the processors.

The processors may be represented as control parts, controllers, control units, or computers.

The memories 1512 and 1522 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a base-band circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the procedure of transceiving a wake-up signal as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

FIG. 16 illustrates a block diagram of a wireless device according to an example of the present specification.

Specifically, FIG. 16 illustrates the terminal (UE) of FIG. 15 in detail.

Referring to FIG. 16, the UE may include a processor (or a digital signal processor (DSP) 1610, a radio frequency (RF) module (or an RF unit) 1635, a power management module 1605, an antenna 1640, a battery 1655, a display 1615, a keypad 1620, a memory 1630, a subscriber identification module (SIM) card 1625 (this element is optional), a speaker 1645, and a microphone 1650. The UE may also include a single antenna or multiple antennas.

The processor 1610 implements the functions, processes and/or methods proposed in FIGS. 1 to 14 described above. A layer of a radio interface protocol may be implemented by the processor 1610.

The memory may be connected to the processor 1610 and stores information related to an operation of the processor 1610. The memory 1630 may be present within or outside the processor 1610 and may be connected to the processor 1610 by a well known unit.

A user may input command information such as a phone number, or the like, by pressing (or touching) a button of the keypad 1620 or by voice activation using the microphone 1650. The processor 1610 receives the command information and performs an appropriate function such as making a call, or the like. Operational data may be extracted from the SIM card 1625 or the memory 1630. Also, the processor 1610 may display command information or driving information on the display 1615 for user recognition or for user convenience.

The RF module 1635 is connected to the processor 1610 and transmits and/or receives an RF signal. The processor 1610 delivers command information to the RF module 1635 in order to initiate communication, for example, in order to transmit a wireless signal forming voice communication data. The RF module 1635 includes a receiver and a transmitter to receive and transmit a wireless signal. The antenna 1640 serves to transmit and receive a wireless signal. When a wireless signal is received, the RF module 1635 delivers the signal and converts the signal to a baseband signal so as to be processed by the processor 1610. The processed signal may be converted into an audible or readable information output through the speaker 1645.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Examples in which the method for transmitting and receiving a wake-up signal in a wireless communication system according to an embodiment of the present invention has been applied to IEEE 802.11 and 3GPP LTE/LTE-A/LTE-Pro/New RAT systems have been described, but the method may be applied to various wireless communication systems in addition to IEEE 802.11 and 3GPP LTE/LTE-A/LTE-Pro/New RAT systems.

The invention claimed is:

1. A method for transmitting a wake-up signal in a wireless communication system supporting a wake-up radio (WUR), the method performed by a network entity comprising:
    assigning, to a terminal, a specific category among a plurality of categories which are related to an WUR operation,
    wherein the plurality of categories are indexed according to $i \geq 0$,
    wherein each category, among the plurality of categories, has a pre-defined configuration of a duty cycle,
    wherein the duty cycle for each category, among the plurality of categories, is configured differently, and all of the plurality of categories have a common on-time duration, and
    wherein a duty cycle of category 0 having $i=0$ is an integer multiple of a duty cycle of category i having $i>0$,
    wherein the integer multiple is greater than 1;
    transmitting, to the terminal, information for the specific category; and
    transmitting, to the terminal, the wake-up signal based on the specific category,
    wherein the wake-up signal is transmitted in the common on-time duration, and
    wherein the specific category is determined based on a traffic characteristic supported by the terminal.

2. The method of claim 1,
    wherein the wake-up signal is transmitted to another terminal assigned to a different category in the common on-time duration, and
    wherein the different category is determined based on a traffic characteristic supported by the another terminal.

3. The method of claim 2,
    wherein the wake-up signal includes indication information for indicating whether the wake-up signal is transmitted to multiple terminals or to only a single terminal.

4. The method of claim 3,
    wherein based on the indication information being mapped to an index of a golay sequence having a length of 64, the wake-up signal is transmitted to multiple terminals.

5. The method of claim 4,
    wherein based on the indication information being mapped to 1st index of the golay sequence, the wake-up signal is broadcast, and
    wherein based on the indication information being mapped to 32nd index of the golay sequence, the wake-up signal is multicast.

6. The method of claim 3,
    wherein based on the indication information indicating that the wake-up signal is transmitted to the single terminal, the wake-up signal is unicast, and
    wherein based on the indication information indicating that the wake-up signal is transmitted to multiple terminals, the wake-up signal is multicast, or broadcast.

7. The method of claim 1,
    wherein the network entity is an access point (AP) or a base station.

8. The method of claim 1,
    wherein the information for the specific category further includes a reference time used to calculate a next available starting time of an on-time duration.

9. The method of claim 1,
    wherein each category, among the plurality of categories, has a plurality of power save modes.

10. The method of claim 1, further comprising:
    receiving, from the terminal, WUR capability information,
    wherein the specific category is assigned based on the WUR capability information.

11. The method of claim 1,
    wherein the common on-time duration represents that each of
    (i) a start timing of an on-time of each duty cycle for each category and
    (ii) a duration of the on-time of each duty cycle is same for all of the plurality of categories.

12. The method of claim 1,
    wherein the traffic characteristic represents whether a traffic is
    regular or
    intermittent.

13. A method for receiving a wake-up signal in a wireless communication system supporting a wake-up radio (WUR), the method performed by a terminal comprising:

receiving, through a low power receiver of the terminal, information for a specific category among a plurality of categories which are related to an WUR operation, wherein the plurality of categories are indexed according to $i \geq 0$, wherein each category, among the plurality of categories, has a pre-defined configuration of a duty cycle, wherein the duty cycle for each category, among the plurality of categories, is configured differently, wherein a duty cycle of category 0 having $i=0$ is an integer multiple of a duty cycle of category i having $i>0$, wherein the integer multiple is greater than 1;

wherein a duty cycle corresponding to the specific category is configured based on the information;

monitoring, by the low power receiver of the terminal, the wake-up signal for an on-time duration corresponding to the duty cycle corresponding to the specific category; and waking up a main transceiver of the terminal based on the wake-up signal being received in the on-time duration, wherein the on-time duration is commonly configured for all of the plurality of categories, and wherein the specific category is determined based on a traffic characteristic supported by the terminal.

14. The method of claim 13, wherein the wake-up signal includes indication information for indicating whether the wake-up signal is transmitted to multiple terminals or to only a single terminal.

15. The method of claim 14, wherein the wake-up signal further includes terminal identification information for identifying the terminal.

16. The method of claim 13, further comprising:

transmitting WUR capability information of the terminal, wherein the specific category is assigned based on the WUR capability information.

17. The method of claim 13, wherein the terminal is a WUR device including a WUR receiver.

\* \* \* \* \*